Sept. 4, 1934.                A. L. BAUSMAN                 1,972,753
                              TRANSFER DEVICE
                      Filed June 10, 1932        2 Sheets-Sheet 1
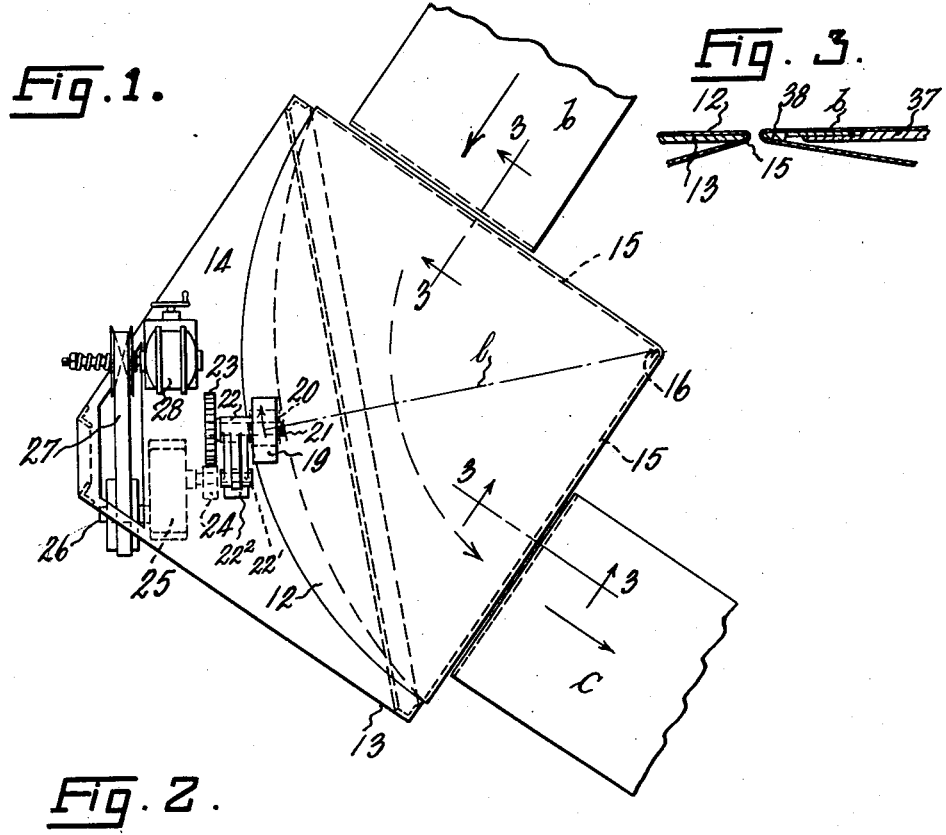
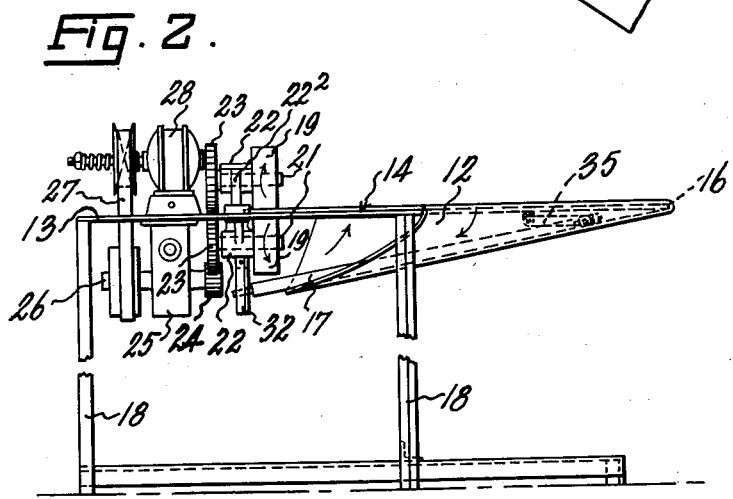
INVENTOR.
ALONZO LINTON BAUSMAN
BY Chapin & Neal
ATTORNEYS.

Sept. 4, 1934.     A. L. BAUSMAN     1,972,753
TRANSFER DEVICE
Filed June 10, 1932     2 Sheets-Sheet 2
Fig. 4.     Fig. 5.
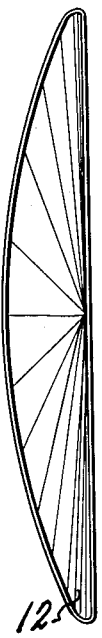
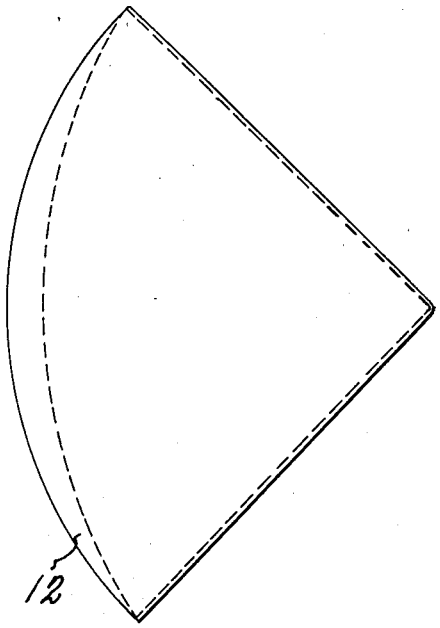
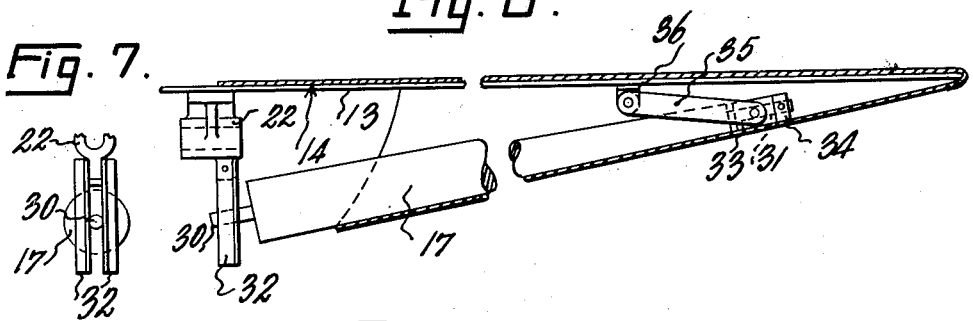
Fig. 6.
Fig. 7.
Fig. 8.
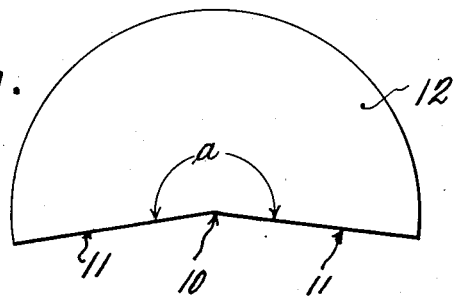
INVENTOR
ALONZO LINTON BAUSMAN
BY Chapin & Neal
ATTORNEYS Patented Sept. 4, 1934

1,972,753

UNITED STATES PATENT OFFICE 1,972,753

TRANSFER DEVICE

Alonzo Linton Bausman, Springfield, Mass.

Application June 10, 1932, Serial No. 616,433

7 Claims. (Cl. 198—25)

This invention relates to improvements in transfer devices of the turntable type for interposition between two conveyers to effect the transfer of articles from one to the other.

The invention is an improvement on that disclosed in my U. S. Patent No. 1,823,483, granted September 15, 1931. In common with the invention of said patent, the present invention seeks to provide a transferring means which will satisfactorily handle confections and the like. Characteristics of the transfer device are that it transfers confections without requiring them to drop, bump or slide during the transfer and that it transfers the confections to the receiving conveyer and places them thereon in the same spacing, relative location, and orderly arrangement which existed on the delivery conveyer.

This invention has for an object an improvement on the transfer device of said patent, to render it capable of transferring articles from one to the other of two non-parallel conveyers. The transfer device of said patent turned the articles through an angle of 180 degrees. The device of this invention is effective to turn the articles through lesser angles.

More particularly, the present invention provides, as the essential transfer element, an endless flexible belt made up in the form of a hollow cone or part of a hollow cone. This belt is used in connection with a fixed support having a plane upper face and two angularly related, and usually intersecting side edges. The belt travels over said surface moving upwardly around one of said edges and downwardly around the other with the apex of the conical belt located at the point of intersection of said edges. Part of the belt lies flatly against said support while the remainder hangs below said support in loop form. Thus, the belt, although made up in the form of a hollow cone, does not assume this shape in the operation.

Other objects will appear as the detailed description proceeds and will be pointed out in the appended claims.

The invention will be disclosed for illustrative purposes in connection with the accompanying drawings, in which:

Figs. 1 and 2 are top plan and side elevational views respectively, of a transfer device embodying my invention;

Fig. 3 is a sectional view thereof taken on either of the lines 3—3 of Fig. 1;

Figs. 4 and 5 are end elevational and plan views, respectively, of the transfer belt, shown apart from its support;

Fig. 6 is an enlarged, fragmentary, side elevational view of the belt supporting means with the belt shown in section;

Fig. 7 is a fragmentary end view of a part shown in Fig. 6; and

Fig. 8 is a developed view of the belt.

Referring to these drawings; the invention features a transfer device, which receives articles carried by one belt conveyer and transfers them to another belt conveyer without dropping them during the transfer and in such a manner that the articles are placed on the second conveyer in the same orderly arrangement that existed in the first conveyer. This transfer device will turn the articles through any desired angle less than 180 degrees (as shown 90 degrees) and is designed to carry the articles in a horizontal plane, or in a plane which is sufficiently close to the horizontal so that the articles will not fall off the transfer device nor slide out of place during the transfer. The transfer device, in the article-conveying portion of its travel, can and preferably does lie in the same plane as the adjacent ends of the two conveyers, with which it cooperates.

The transfer device comprises a belt of suitable flexible material, such for example as paper, canvas or the like. This belt is made up from a blank, such as that shown in Fig. 8, which is a sector of a circle drawn from the center 10 and having radial edges 11. The angle $a$ of the sector will vary according to the angle between the two conveyers $b$ and $c$ (Fig. 1) with which it cooperates and the angle shown is that used when the conveyers are at right angles as shown in Fig. 1. The angle need be but a little greater than 180 degrees in this case. The belt is formed by rolling up the blank shown in Fig. 8 into the form of a hollow cone and securing together in any suitable way the two edges 11. The finished belt is shown at 12 in Figs. 4 and 5 in the form which it assumes in the practical operation of the device rather than in true conical form.

The support for the belt comprises a member 13 having a plane upper surface 14 and two angularly-related and intersecting side edges 15. These edges preferably do not meet in a sharp point but in a rounded corner 16. As shown the edges 15 are at right angles but the angle between these edges may be made greater or less according to the requirements of any particular case. The member 13 may desirably be a plate of metal and it may be supported in any suitable manner as by legs 18, from the floor.

The belt 12 is slipped over the support 13 so that part of it rests upon the plane face 14 and its apex lies at the corner 16. The lower part of the belt will hang below the support 13 as shown in Fig. 2, and is pressed downwardly in any suitable way, as by the weight of the idler roll 17 to take up the slack and tension the belt.

The belt 12 is driven and forced to turn about the center 16 by power applied adjacent its outer peripheral portion, and in such a manner that a radial as well as a tangential pull is imparted thereto. Thus, a pair of coacting drive rolls 19, disposed one above and one below support 13, grip the belt 12 adjacent its outer edge while traveling over the surface 14. The member 13 has an opening 20 therethrough (see Fig. 1) to allow the lower roll to engage the belt. The axes of the rolls 19, it will be noted, are not parallel to the radial line such as $l$ in Fig. 1, drawn from center 16 to the center of the line of contact of the rolls with belt 12. As a result, the force imparted by the rolls to belt 12 may be resolved into a driving component in a tangential direction (or at right angles to said radial lines) and a stretching component in an outward radial direction. The belt 12 is thus pulled radially outward as it is driven and this, with the pressure of the idler 17, causes that portion of the belt 12 which rests on surface 14 to be drawn smooth and taut.

The rolls 19 may be mounted and driven in any suitable way. As shown, each is fixed to one end of a short shaft 21 mounted in a bracket 22. One roll, the upper, is mounted for movement toward the other, its bracket 22 being hinged at 22' to a bracket 22² fixed to member 13. The lower bracket 22 is fixed to member 13. Any suitable means may be used to press the upper roll 19 downwardly, as for example the means shown in the prior patent for this purpose. On the other end of each shaft 21 is fixed a gear 23. These gears 23 intermesh (the member 13 being suitably recessed to permit) and consequently they revolve in opposite directions as indicated by the arrows in Fig. 2, causing the belt 12 to travel in the direction shown by the arrow in Fig. 1. One of the gears 23 is driven by a pinion 24 fixed on the driven shaft of a suitable transmission housed within the casing 25 fixed to the lower side of member 13. The driving shafts 26 of such transmission is driven by a belt 27 and suitable pulleys from a source of power, such as an electric motor 28, mounted on the top face of member 13. The drive from the motor to shaft 26, as indicated, is of a well known commercial type, known as the "Reeves" variable speed drive.

The idler roll 17 is preferably conical, as best shown in Fig. 6. Theoretically, it should extend to the apex of the belt but, practically, this is not feasible and therefore it stops short of such point. The idler roll has trunnions 30 and 31 at its ends. The rear trunnion 30 is slidably received between a pair of vertical guides 32 fixed to and depending from the bracket 22. The front trunnion 31 is revolubly mounted in a bearing 33 and held against undue axial movement therein by a collar 34 fixed to the trunnion. The bearing block 33 is received between and pivotally connected to the outer ends of a pair of radius links 35, which at their other ends are pivotally supported from a bracket 36, secured to the lower face of the support 13. It will thus be seen that the idler 17 is free to follow the belt and by its weight to press down upon the belt and tension the same.

In use the transfer device is mounted, as indicated in Fig. 1, between the ends of two conveyers $b$ and $c$, with the delivery edge of conveyer $b$ arranged in parallel and closely adjacent with one of the edges 15 and the receiving edge of the conveyer $c$ arranged in similar relation with the other edge 15. These conveyers $b$ and $c$ in their article-conveying stretches, travel over and are supported upon a table 37 which at its ends has a thin rounded edge 38 about which the conveyer turns in passing from its upper to its lower stretch of travel. The conveyers $b$ and $c$ thus make sharp turns at those edges which lie adjacent the edges 15 and may thus be mounted closely adjacent thereto so as to leave only a small gap, which is readily bridged by the confections. It will be seen that the transfer device, in its article conveying stretch of travel, lies in the same plane as the corresponding stretches of conveyers $b$ and $c$, wherefore the articles are transferred without dropping.

In operation, articles such for example as confections, are carried usually in transverse rows upon the upper stretch of belt $b$. These articles or rows of articles traveling in the direction of the arrow shown in Fig. 1 are successively transferred to the upper stretch of belt 12 onto which they slide without dropping. The articles in each transverse row are carried in arc like paths of different radii and thus of different length and at different speeds, but all such articles arrive at the receiving end of belt $c$ at the same time and are transferred thereto in one transverse row,— the individual articles thereof being aligned one with another and spaced in the same way that they were on belt $b$.

It should be noted that the belt 12 need not necessarily have the complete hollow conical form shown. The outer edge need not be concentric with the apex 16 and the belt need not necessarily include the apex portion although that is now considered the best form. It is sufficient that the belt have a form which is at least part of the exterior surface of a cone and which, if slipped over a cone of the proper dimensions, would fit the exterior tapering surface thereof.

The invention has been disclosed herein, in an embodiment at present preferred, for illustrative purposes but the scope of the invention is defined by the appended claims rather than by the foregoing description.

What I claim is:

1. A transfer device, comprising a support presenting a plane upper face and two straight marginal edges disposed in angular relation and separated by an angle less than 180 degrees, an endless belt made up as part at least of a conical surface and trained around said edges with its upper stretch resting flatly against said face and its lower stretch looped beneath said support, means for driving said belt and causing it to turn about an axis which coincides with the point where said edges tend to intersect, and a tensioning roll of conical form for said belt, said roll mounted below said support with its axis in converging relation therewith and directed toward said point, said roll tapering toward said point.

2. A transfer device, comprising, a support having a plane upper surface and two intersecting marginal edges, an endless belt of conical form trained around said edges and resting in part on said surface of said support and in part looped below the same with the apex of the belt located at the point of intersection of said edges, and means for driving said belt to turn about said apex.

3. A transfer device, comprising, a support having a plane upper surface and two intersecting marginal edges, an endless belt of conical form trained around said edges and resting in part on said surface of said support and in part looped below the same with the apex of the belt located at the point of intersection of said edges, and means for driving said belt to turn about said apex and imparting a pull to the belt in a direction radially outward from said apex as well as a tangentially directed force to turn the belt.

4. A transfer device, comprising, a support having a plane upper surface and two intersecting marginal edges, an endless belt of conical form trained around said edges and resting in part on said surface of said support and in part looped below the same with the apex of the belt located at the point of intersection of said edges, means for driving said belt to turn about said apex, and means acting on said belt in its lower stretch of travel to tension the same and draw it snugly around said edges.

5. A transfer device, comprising, a support having a plane upper surface and two intersecting marginal edges, an endless belt of conical form trained around said edges and resting in part on said surface of said support and in part looped below the same with the apex of the belt located at the point of intersection of said edges, means for driving said belt to turn about said apex, and means acting on said belt in its lower stretch of travel to tension the same and draw it snugly around said edges, said driving means imparting a pull to the belt in a direction radially outward from said apex as well as a tangentially directed force to turn said belt about said apex.

6. A transfer device comprising a fixed support having a plane upper surface bounded in part by two straight edges extending along lines tending to intersect, an endless belt made up as part at least of a conical surface and trained around said edges with its upper stretch resting on said support and its lower stretch looped beneath the same, said belt mounted on said support with freedom to slide in an arc-like path having for its center a point where said lines tend to intersect, means for tensioning said belt in its lower stretch of travel and drawing it snugly around the edges of said support, said belt having freedom to slide radially inward toward the center and means for imparting to the belt a tangentially directed driving force to move it in said arc-like path, and a radially outwardly directed stretching force to resist radially inward movement of the belt on said support.

7. A transfer device comprising a fixed support having a plane upper surface bounded in part by two straight edges extending along lines tending to intersect, an endless belt having one edge of greater length than the other, said belt trained around the edges of the support with the lower stretch looped beneath the same, said belt mounted on said support with the upper stretch having freedom to slide in an arc-like path and having for its center a point where said lines tend to intersect, means for tensioning said belt in its lower stretch of travel and drawing it snugly around the edges of said support, said belt having freedom to slide radially inward toward the center, and means for imparting to the belt a tangentially directed driving force to move it in said arc-like path and a radially outwardly directed stretching force to resist radially inward movement of the belt on said support.

ALONZO LINTON BAUSMAN.